3,755,593
TREATMENT OF PEPTIC ULCERATION
WITH XANTHENE DERIVATIVES
Stewart Sanders Adams, Bernard John Armitage, Norman William Bristow, and Bernard Vincent Heathcote, Nottingham, England, assignors to The Boots Company Limited, Nottingham, England
No Drawing. Continuation-in-part of application Ser. No. 858,183, Sept. 15, 1969, now Patent No. 3,686,218, which is a continuation-in-part of application Ser. No. 662,987, Aug. 23, 1967, now Patent No. 3,644,420. This application July 31, 1972, Ser. No. 276,670
Claims priority, application Great Britain, Sept. 2, 1966, 39,384/66; Apr. 5, 1967, 15,692/67
Int. Cl. A61k 27/00
U.S. Cl. 424—283    11 Claims

ABSTRACT OF THE DISCLOSURE

Xanthene derivatives having utility in the treatment of peptic ulceration.

---

This application is a continuation-in-part of our copending application Ser. No. 858,183, filed Sept. 15, 1969, now U.S. Pat. 3,686,218, which in turn is a continuation-in-part of our application Ser. No. 662,987, filed Aug. 23, 1967, now U.S. Pat. No. 3,644,420, the entire disclosure of which is incorporated herein by reference. The subject matter of this application was subjected to a requirement for restriction in application Ser. No. 662,987, Paper No. 4.

This invention relates to new derivatives of xanthene which have utility in the treatment of peptic ulceration.

Peptic ulceration is a comparatively frequent occurrence and treatment of such as condition is by surgery, by neutralisation of gastric acid using alkaline media such as alumina and magnesia, or adsorbents such as magnesium trisilicate, or by administration of anti-secretory drugs which reduce the output of acid in the stomach. It is obviously desirable to avoid surgery if possible, but, up to now, antacid and anti-secretory treatment has not been entirely satisfactory. The action of antacids is almost immediate and is of short duration; this makes it difficult to control nocturnal gastric secretion by the use of antacids. Many anti-secretory agents are anti-cholinergic substances which give rise to unwanted side effects such as dryness of the mouth, mydriasis and other atropine-like effects.

According to the present invention there are provided compounds of General Formula I

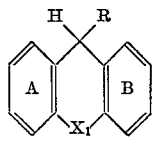
(I)

in which R is

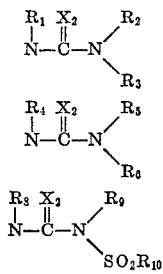

$X_1$ is oxygen or sulphur;
$X_2$ is oxygen or sulphur;
$R_1$ is alkyl, alkenyl, cycloalkyl, substituted alkyl, hydroxy, acyloxy, alkoxy, trialkylsiloxy, or when R is hydroxy or acyloxy, hydrogen;
$R_2$ is hydrogen, alkyl, alkenyl, cycloalkyl, substituted alkyl, trialkylsilyl, hydroxy, alkoxy, trialkylsiloxy or acyloxy;
$R_3$ is hydrogen, alkyl, alkenyl, cycloalkyl, substituted alkyl, or acyl;
$R_4$ is amino, acylamino, acyl(alkyl)amino, alkylamino or dialkylamino;
$R_5$ is hydrogen, alkyl, alkenyl, cycloalkyl or substituted alkyl;
$R_6$ is hydrogen, alkyl, alkenyl, cycloalkyl, substituted alkyl, amino, acylamino, $N=CR_5R_7$, or acyl;
$R_7$ is alkyl or aryl;
$R_8$ is hydrogen, alkyl, alkenyl, cycloalkyl, substituted alkyl, hydroxy, acyloxy, alkoxy, trialkylsiloxy, or $SO_2R_{10}$;
$R_9$ is hydrogen, alkyl, alkenyl, cycloalkyl, or substituted alkyl;
$R_{10}$ is alkyl or aryl;
or $NR_2R_3$ is a 5–7 membered ring heterocyclic group, optionally substituted;
the rings A and B may optionally contain substituents selected from halogen, alkyl, alkoxy, and hydroxy: together with (a) esters and amides of those compounds containing a carboxyl group and
(b) salts of those compounds containing a carboxyl group or a basic nitrogen atom.

It has been found that compounds of General Formula I are anti-secretory agents, with a specific activity against gastric secretion and without any anticholinergic activity.

The most readily accessible compounds of General Formula I, and therefore, a preferred group, are those wherein R is

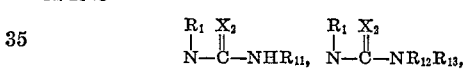

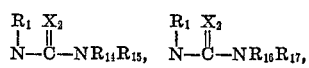

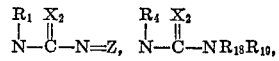

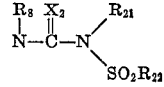

in which $X_2$ is oxygen or sulphur;
$R_1$ is alkyl, alkenyl, cycloalkyl, hydroxyalkyl, haloalkyl, aminoalkyl, acylaminoalkyl, alkylaminoalkyl, acyl(alkyl)aminoalkyl, dialkylaminoalkyl, aryloxyalkyl, alkoxyalkyl, aralkyl, acyloxyalkyl, carboxyalkyl, hydroxy, alkoxy, trialkylsiloxy, acyloxy, or when $R_{11}$ or $R_{15}$ is hydroxy or acyloxy, hydrogen;
$R_{11}$ is hydrogen, alkyl, alkenyl, cycloalkyl, hydroxyalkyl, haloalkyl, aminoalkyl, acylaminoalkyl, alkylaminoalkyl, acyl(alkyl)aminoalkyl, dialkylaminoalkyl, aryloxyalkyl, alkoxyalkyl, acyloxyalkyl, aralkyl, carboxyalkyl, hydroxy, alkoxy, trialkylsiloxy, trialkylsilyl, acyloxy, acyl or xanthenyl-N($R_1$)-CONHalkyl;
$R_{12}$ is alkyl, alkenyl, cycloalkyl, aralkyl, dialkylaminoalkyl, aryloxyalkyl or alkoxyalkyl;
$R_{13}$ is alkyl, alkenyl, cycloalkyl, aralkyl, dialkylaminoalkyl, aryloxyalkyl, alkoxyalkyl, or acyl;
$R_{14}$ is alkyl, alkenyl, cycloalkyl, aralkyl, aryloxyalkyl, alkoxyalkyl or acyl;
$R_{15}$ is hydroxy or acyloxy;
$R_{16}$ is alkoxy or trialkylsiloxy;
$R_{17}$ is alkyl, aralkyl, dialkylaminoalkyl or acyl;
$N=Z$ is a 5–7 membered ring heterocyclic group; optionally substituted;

$R_4$ is amino, acylamino, acyl(alkyl)amino, alkylamino or dialkylamino;

$R_{18}$ is hydrogen or alkyl;

$R_{19}$ is hydrogen, alkyl, amino, acylamino, $N=CR_{20}R_7$ or acyl;

$R_{20}$ is hydrogen or alkyl;

$R_7$ is alkyl or aryl;

$R_8$ is hydrogen, alkyl, alkenyl, cycloalkyl, hydroxyalkyl, haloalkyl, aminoalkyl, acylaminoalkyl, alkylaminoalkyl, acyl(alkyl)aminoalkyl, dialkylaminoalkyl, aryloxyalkyl, alkoxyalkyl, aralkyl, acyloxyalkyl, carboxyalkyl, hydroxy, alkoxy, trialkylsiloxy, acyloxy, or $SO_2R_{22}$;

$R_{21}$ is hydrogen or alkyl;

$R_{22}$ is alkyl, phenyl or phenyl containing substituents such as halogen, alkyl, alkoxy, hydroxy, amino, alkylamino, acylamino, dialkylamino or nitro.

Examples of esters covered by (a) above include those derived from alcohols e.g. methanol, ethanol, propanol, butanol, benzyl alcohol, 2-phenylethanol, and those derived from phenols.

Examples of salts covered by (b) above are the alkali metal, alkaline earth metal, ammonium and organic amine salts of carboxylic acids, and acid-addition salts of the basic compounds formed with mineral acids e.g. hydrochloric, sulphuric, nitric, phosphoric, or with organic acids e.g. acetic, maleic, methanesulphonic, embonic.

The terms "alkyl," "alkenyl" and "aralkyl" are used herein to indicate such groups containing up to 7 carbon atoms in the aliphatic moiety.

The term "acyl" is used herein to indicate the acyl residue of a carboxylic acid, which may be an aliphatic acid, an aromatic acid, an N-substituted carbamic acid, a carbonic acid or a heterocyclic carboxylic acid. Examples of such acyl groups are the following:

alkanoyl, e.g. acetyl, propionyl, butyryl, valeryl, octanoyl, stearyl, pivaloyl, ethoxalyl;

substituted alkanoyl, e.g. phenylalkanoyl such as phenylacetyl; substituted phenylalkanoyl containing substituents such as halogen, alkyl, alkoxy, hydroxy, amino, alkylamino, acylamino, dialkylamino or nitro in the phenyl ring; phenoxyalkanoyl such as phenoxyacetyl; substituted phenoxyalkanoyl containing substituents such as halogen, alkyl, alkoxy, hydroxy, amino, alkylamino, acylamino, dialkylamino or nitro in the phenyl ring; haloalkanoyl such as beta-chloropropionyl; alkoxyalkanoyl such as methoxyacetyl; alkylthioalkanoyl such as methylthioacetyl; dialkylaminoalkanoyl such as diethylaminoacetyl; acyl alkanoyl such as acetoacetyl; cycloalkyl alkanoyl such as cyclohexylacetyl; carboxyalkanoyl such as beta-carboxypropionyl; carboxyalkenoyl such as beta-carboxyacryloyl, and similar groups in ester or salt form; heterocyclic alkanoyl such as pyridineacetyl;

alkenoyl e.g. crotonyl;

cycloalkanoyl e.g. cyclohexylcarbonyl;

aroyl e.g. benzoyl, naphthoyl, substituted benzoyl in which the phenyl ring contains substituents such as halogen, alkyl, alkoxy, hydroxy, amino, alkylamino, acylamino, dialkylamino, nitro or carboxyl (and esters and salts thereof);

residues of carbonic acid e.g. alkoxycarbonyl such as methoxycarbonyl, ethoxycarbonyl; substituted alkoxycarbonyl such as 2-methoxyethoxycarbonyl, 2-phenoxyethoxycarbonyl, 2-chloroethoxycarbonyl, 2,2,2-trichloroethoxycarbonyl; alkenyloxycarbonyl such as allyloxycarbonyl; cycloalkoxycarbonyl such as cyclohexyloxycarbonyl; aryloxycarbonyl such as phenoxycarbonyl; and similar groups containing halogen, alkyl, alkoxy, hydroxy, amino, alkylamino, acylamino, dailkylamino or nitro substituents in the phenyl ring; aralkoxycarbonyl such as 2-phenylethoxycarbonyl;

N-substituted carbamoyl e.g. N-arylcarbamoyl such as N-phenylcarbamoyl;

heterocyclic carbonyl e.g. groups comprising a carbonyl radical attached to a 5–7 membered heterocyclic ring containing up to two hetero atoms selected from oxygen, sulphur and nitrogen, such as thiophen, tetrahydrothiophen, furan, tetrahydrofuran, pyridine, benzothiazole, benzofuran, xanthen, pyrimidine.

The following list of compounds illustrates various types of compounds which fall within General Formula I.

(a) Illustrating variations of $R_1$ and $R_8$

N,N'-dimethyl-N-9-xanthenylurea
N,N'-divinyl-N-9-xanthenylurea
N-cyclohexyl-N'-methyl-N-9-xanthenylurea
N-hydroxy-N-9-xanthenylurea
N-methoxy-N'-methyl-N-9-xanthenylurea
N-trimethylsiloxy-N-trimethylsilyl-N-9-xanthenylurea
N-acetoxy-N-9-xanthenylurea
N-benzyl-N'-ethyl-N-9-xanthenylurea
N,N'-di(2-hydroxyethyl)-N-9-xanthenylurea
N,N-di(2-chloroethyl)-N-9-xanthenylurea
N'-methyl-N-(2-phenoxyethyl)-N-9-xanthenylamine
N,N'-di(2-aminoethyl)-N-9-xanthenylurea
N,N'-di(2-methylaminoethyl)-N-9-xanthenylurea
N,N'-di(ethoxycarbonylmethyl)-N-9-xanthenylurea
N-(2-diethylaminoethyl)-N'-methyl-N-9-xanthenylurea
N,N'-di(2-acetoxyethyl)-N-9-xanthenylurea
N,N'-di(methoxymethyl)-N-9-xanthenylurea
N-hydroxy-N-methyl-N'-9-xanthenylurea (b) Illustrating variations of $NHR_{11}$ N-methyl-N-9-xanthenylurea
N-hydroxy-N'-methyl-N-9-xanthenylurea
N-methyl-N'-vinyl-N-9-xanthenylurea
N-methyl-N'-cyclohexyl-N-9-xanthenylurea
N,N'-dibenzyl-N-9-xanthenylurea
N-hydroxy-N'-(2-hydroxyethyl)-N-9-xanthenylurea
N'-(2-chloroethyl)-N-methyl-N-9-xanthenylurea
N'-(2-aminoethyl)-N-methyl-N-9-xanthenylurea
N'-(2-diethylaminoethyl)-N-methyl-N-9-xanthenylurea
N-methyl-N'-(2-methylaminoethyl)-N-9-xanthenylurea
N-methyl-N'-(2-phenoxyethyl)-N-9-xanthenylurea
N'-(2-acetoxyethyl)-N-hydroxy-N-9-xanthenylurea
N'-(2-methoxyethyl)-N-methyl-N-9-xanthenylurea
N'-acetyl-N-hydroxy-N-9-xanthenylurea
N'-hydroxy-N-methyl-N-9-xanthenylurea
N,N'-dimethoxy-N-9-xanthenylurea
N'-acetoxy-N-methyl-N-9-xanthenylurea
N'-(ethoxycarbonylmethyl)-N-methyl-N-9-xanthenylurea
N'-trimethylsiloxy-N-methyl-N-9-xanthenylurea
N-methyl-N'-(phenoxycarbonylmethyl)-N-9-xanthenylurea
N'-(carboxymethyl)-N-methyl-N-9-xanthenylurea
N-hydroxy-N'-methanesulphonyl-N-9-xanthenylurea
N'-benzenesulphonyl-N-methyl-N-9-xanthenylurea
1,6-di(N-hydroxy-N-9-xanthenylureido)hexane (c) Illustrating variations of $NR_{12}R_{13}$ N',N'-diethyl-N-hydroxy-N-9-xanthenylurea
N,N',N'-trimethyl-N-9-xanthenylurea
N'-allyl-N,N'-dimethyl-N-9-xanthenylurea
N'-cyclohexyl-N,N'-dimethyl-N-9-xanthenylurea
N'-benzyl-N,N'-dimethyl-N-9-xanthenylurea
N'-(2-dimethylaminoethyl)-N,N'-dimethyl-N-9-xanthenylurea
N,N'-dimethyl-N'-(2-phenoxyethyl)-N-9-xanthenylurea
N'-(2-ethoxyethyl)-N,N'-dimethyl-N-9-xanthenylurea
N'-ethoxycarbonyl-N,N'-dimethyl-N-9-xanthenylurea
N',N'-diallyl-N-methyl-N-9-xanthenylurea
N'-allyl-N'-cyclohexyl-N-methyl-N-9-xanthenylurea
N'-allyl-N'-benzyl-N-methyl-N-9-xanthenylurea
N'-allyl-N'-(2-dimethylaminoethyl)-N-methyl-N-9-xanthenylurea
N'-allyl-N'-(2-phenoxyethyl)-N-methyl-N-9-xanthenylurea N'-allyl-N'-(2-ethoxyethyl)-N-methyl-N-9-xanthenyl-
urea
N'-allyl-N'-ethoxycarbonyl-N-methyl-N-9-xanthenylurea (d) Illustrating variations of $NR_{14}R_{15}$ N-hydroxy-N-methyl-N'-9-xanthenylurea
N-allyl-N-hydroxy-N'-9-xanthenylurea
N-cyclohexyl-N-hydroxy-N'-9-xanthenylurea
N-benzyl-N-hydroxy-N'-9-xanthenylurea
N-hydroxy-N-(2-phenoxyethyl)-N'-9-xanthenylurea
N-(2-ethoxyethyl)-N-hydroxy-N'-9-xanthenylurea
N-ethoxycarbonyl-N-hydroxy-N'-9-xanthenylurea
N-acetoxy-N-methyl-N'-9-xanthenylurea
N-acetoxy-N-allyl-N'-9-xanthenylurea
N-acetoxy-N-cyclohexyl-N'-9-xanthenylurea
N-acetoxy-N-benzyl-N'-9-xanthenylurea
N-acetoxy-N-(2-phenoxyethyl)-N'-9-xanthenylurea
N-acetoxy-N-(2-ethoxyethyl)-N'-9-xanthenylurea
N-acetoxy-N-ethoxycarbonyl-N'-9-xanthenylurea (e) Illustrating variations of $NR_{16}R_{17}$ N'-methoxy-N,N'-dimethyl-N-9-xanthenylurea
N'-benzyl-N'-methoxy-N-methyl-N-9-xanthenylurea
N'-(2-dimethylaminoethyl)-N'-methoxy-N-methyl-N-9-
xanthenylurea
N'-ethoxycarbonyl-N'-methoxy-N-methyl-N-9-xanthenyl-
urea
N'-trimethylsiloxy-N,N'-dimethyl-N-9-xanthenylurea (f) Illustrating variations of N=Z N-hydroxy-N',N'-tetramethylene-N-9-xanthenylurea
N-hydroxy-N',N'-3-oxapentamethylene-N-9-xanthenyl-
urea
N-hydroxy-N,N'-pentamethylene-N-9-xanthenylurea (g) Illustrating variations of $R_4$, $R_7$, $R_{18}$, $R_{19}$ and $R_{20}$ 2-(9-xanthenyl)semicarbazide
1-acetyl-2-(9-xanthenyl)semicarbazide
1-methyl-2-(9-xanthenyl)semicarbazide
1,1-dimethyl-2-(9-xanthenyl)semicarbazide
4-methyl-2-(9-xanthenyl)semicarbazide
2-(9-xanthenyl)carbohydrazide
1,5-diacetyl-2-(9-xanthenyl)carbohydrazide
1-methyl-4-(9-xanthenyl)biurea
4-acetyl-2-(9-xanthenyl)semicarbazide
5-benzylidene-2-(9-xanthenyl)carbohydrazide (h) Illustrating variations of $R_{21}$ and $R_{22}$ N-hydroxy-N'-methanesulphonyl-N-9-xanthenylurea
N'-benzenesulphonyl-N-methyl-N-9-xanthenylurea
N'-p-toluenesulphonyl-N-methyl-N-9-xanthenylurea
N-methanesulphonyl-N,N'-dimethyl-N'-9-xanthenylurea
N-benzenesulphonyl-N,N'-dimethyl-N'-9-xanthenylurea (i) Illustrating variations of acyl N-acetoxy-N'-methyl-N-9-xanthenylurea
N-phenylacetoxy-N-9-xanthenylurea
N-phenoxyacetoxy-N-9-xanthenylurea
N-(2-chloropropionoxy)-N-9-xanthenylurea
N-methoxyacetoxy-N-9-xanthenylurea
N-methylthioacetoxy-N-9-xanthenylurea
N-diethylaminoacetoxy-N-9-xanthenylurea
N-acetoacetoxy-N-9-xanthenylurea
N-(3-carboxypropionoxy)-N-9-xanthenylurea
N-(3-carboxyacryloyloxy)-N-9-xanthenylurea
N-cyclohexylacetoxy-N-9-xanthenylurea
N-crotonyloxy-N-9-xanthenylurea
N-cyclohexanoyloxy-N-9-xanthenylurea
N-benzoyloxy-N-9-xanthenylurea
N-ethoxycarbonyloxy-N-9-xanthenylurea
N-phenoxycarbonyloxy-N-9-xanthenylurea
N-2-phenylethoxycarbonyloxy-N-9-xanthenylurea
N-(N-phenylcarbamoyloxy)-N-9-xanthenylurea
N-2-furoyloxy-N-9-xanthenylurea
N-2-tetrahydrofuroyloxy-N-9-xanthenylurea
N-2-thenoyloxy-N-9-xanthenylurea
N-2-tetrahydrothenoyloxy-N-9-xanthenylurea
N-nicotinoyloxy-N-9-xanthenylurea
N-2-methoxyethoxycarbonyloxy-N-9-xanthenylurea
N-2-phenoxyethoxycarbonyloxy-N-9-xanthenylurea
N-2-chloroethoxycarbonyloxy-N-9-xanthenylurea
N-2,2,2-trichloroethoxycarbonyloxy-N-9-xanthenylurea
N-allyloxycarbonyloxy-N-9-xanthenylurea
N-cyclohexyloxycarbonyloxy-N-9-xanthenylurea
N-ethoxyalyloxy-N-9-xanthenylurea
N-9-xanthencarbonyloxy-N-9-xanthenylurea
N-benzothiazole-2-carbonyloxy-N-9-xanthenylurea
N-benzofuran-2-carbonyloxy-N-9-xanthenylurea
N-pyrimidine-2-carbonyloxy-N-9-xanthenylurea
N-3-pyridylacetoxy-N-9-xanthenylurea (j) Substitution of rings A and B N,N'-dimethyl-N-(1-fluoro-9-xanthenyl)urea
N,N'-dimethyl-N-(2-chloro-9-xanthenyl)urea
N,N'-dimethyl-N-(1-methyl-9-xanthenyl)urea
N,N'-dimethyl-N-(2-methoxy-9-xanthenyl)urea
N-hydroxy-N-(2-hydroxy-9-xanthenyl)urea (k) Illustrating variations of $X_1$ and $X_2$ Compounds as listed under (a)–(j) in which the xanthenyl moiety is replaced by the corresponding thiaxanthenyl group, e.g.:

N,N'-dimethyl-N-9-thiaxanthenylurea
N-hydroxy-N-9-thiaxanthenylurea

Compounds as listed under (a)–(j) in which the urea moiety is replaced by the corresponding thiourea group, e.g.:

N,N'-dimethyl-N-9-xanthenylthiourea
N-hydroxy-N'-methyl-N-9-xanthenylthiourea

Compounds in which both replacements are made, e.g.:

N,N'-dimethyl-N-9-thiaxanthenylthiourea
N-hydroxy-N-thiaxanthenylthiourea

The compounds of General Formula I are prepared by conventional methods known for the preparation of substituted ureas and thioureas. The preferred method for any particular compound will depend upon the nature of the hereinbefore defined symbols $X_1$, $X_2$, and $R_1$–$R_{10}$. Typical processes are exemplified by the following (in all cases exact reaction conditions will be readily apparent to those skilled in the art from inherent knowledge, the prior art literature and the examples appended to this specification): (Xn is used to indicate the 9-(thia)xanthenyl or a substituted 9-(thia)xanthenyl group).

(1) Reaction of a 9-xanthenylamine with an isocyanate or isothiocyanate, e.g.:

$$XnNHR_1 + R_{11}NCO \rightarrow XnN(R_1)CONHR_{11}$$

$$XnNHR_4 + \text{Alkyl (or acyl) NCO} \rightarrow XnN(R_4)CONAlkyl \text{ (or acyl)}$$

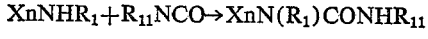

For preparing compounds in which the nitrogen atom remote from the xanthenyl group has two hydrogen atoms attached thereto, an alkali metal cyanate or isothiocyanate or silicon tetraisocyanate or tetraisothiocyanate may be used, e.g.:

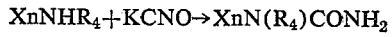

In the case of ureas, the xanthenylamine can be prepared in situ from the appropriate xanthydrol to give some of the compounds of the invention in accordance with the reaction scheme below:

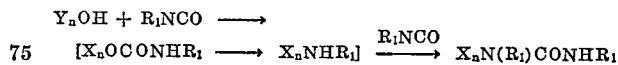

(2) Reaction of a xanthydrol with a substituted urea or thiourea, e.g.:

$XnOH + HN(R_1)CONR_2R_3 \rightarrow XnN(R_1)CONR_2R_3$ $XnOH + HN(R_4)CONR_5R_6 \rightarrow XnN(R_4)CONR_5R_6$ $XnOH + HN(R_8)CON(R_9)SO_2R_{10} \rightarrow$
$XnN(R_8)CON(R_9)SO_2R_{10}$ (3) Reaction of an N-9-xanthenylcarbamic acid ester with an appropriate amine. The carbamate can be prepared by reacting a xanthydrol with a carbamate, such as shown below:

$XnOH + R_1NHCOOEt \rightarrow XnN(R_1)COOEt$ $XnN(R_1)COOEt + NHR_2R_3 \rightarrow XnN(R_1)CONR_2R_3$ (4) Reaction of a xanthenylamine with a carbamoyl halide, e.g.:

$XnNHR_1 + ClCONR_2R_3 \rightarrow XnN(R_1)CONR_2R_3$ $XnNHR_4 + ClCONR_5R_6 \rightarrow XnN(R_4)CONR_5R_6$ (5) Xanthenylureas in which at least one of the nitrogen atoms has a hydrogen atom attached thereto, or where appropriate metal derivatives thereof, may be acylated or alkylated using conventional acylating or alkylating agents, e.g.:

$XnN(R_1)CONHR_2 + HalCOOEt \rightarrow$
$XnN(R_1)CON(R_2)COOEt$ $XnN(R_1)CONHR_2 + (MeCO)_2O \rightarrow$
$XnN(R_1)CON(R_2)COMe$ $XnNHCONR_2R_3 + R_1Hal \rightarrow XnN(R_1)CONR_2R_3$ $XnN(R_8)CONHSO_2R_{22} + R_9Hal \rightarrow$
$XnN(R_8)CON(R_9)SO_2R_{22}$ N'-alkyl-N-hydroxy-N-9-xanthenylureas can be prepared by an alkylation reaction in which an alkyl isocyanate acts as an alkylating agent as follows:

$XnN(OH)CONH_2 + MeNCO \rightarrow XnN(OH)CONHMe$ (6) N-acyl and O-acyl compounds in general may be prepared by conventional acylation of compounds containing amino or hydroxy groups, using standard acylating agents such as acid anhydrides, acid halides, ketenes and isocyanates (to give carbamoyl derivatives), e.g.:

$XnN(OH)CONR_2R_3 + (MeCO)_2O \rightarrow$
$XnN(OCOMe)CONR_2R_3$ $XnN(OH)CONR_2R_3 + PhCOCl \rightarrow$
$XnN(OCOPh)CONR_2R_3$ $XnN(OH)CONR_2R_3 + PhNCO \rightarrow$
$XnN(OCONHPh)CONR_2R_3$ $XnN(OH)CONR_2R_3 + diketene \rightarrow$
$XnN(OCOCH_2COMe)CONR_2R_3$ $XnN(NH_2)CONH_2 + MeNCO \rightarrow$
$XnN(NHCONHMe)CONH_2$ (7) In appropriate cases, an acyloxy compound can be deacylated by known methods to give the corresponding hydroxy compound, e.g.:

$XnN(Me)CONHCH_2CH_2OCOMe \xrightarrow[MeOH]{KCN}$
$XnN(Me)CONHCH_2CH_2OH$ (8) Reaction of 9-xanthenylamine with an appropriate urea, e.g.:

$XnNHMe + MeNHCONHMe \rightarrow XnN(Me)CONHMe$ (9) Reaction of a urea containing a hydroxy group with an alkylating agent or a trialkylsilylating agent, e.g.:

$\underset{XnN-CONH_2}{\overset{O}{|}} + MeI \longrightarrow \underset{XnN-CONH_2}{\overset{OMe}{|}}$ $\underset{XnN-CONH_2}{\overset{OH}{|}} + Me_3SiNHSiMe_3 + Me_3SiCl \longrightarrow$
$\underset{XnN-CONHSiM}{\overset{OSiMe_3}{|}}$

(10) Reaction of a nitrourea with a 9-xanthenylamine, e.g.:

$XnNHR_1 + NO_2 \cdot NHCONHalkyl \rightarrow XnN(R_1)CONHalkyl$

(11) Hydrolysis of esters in appropriate cases, e.g.:

$XnN(OH)CONHCH_2COOEt \rightarrow$
$XnN(OH)CONHCH_2COOH$

The anti-secretory activity of the compounds of the invention has been demonstrated in the stimulated, pylorus-ligated rat, and varies with the value of $X_1$, $X_2$, and $R_1$–$R_{10}$ and with the nature and positions of substituents in rings A and B. In general we have found compounds in which $X_1$ is oxygen to be more active than those in which $X_1$ is sulphur, and compounds in which $X_2$ is oxygen to be more active than those wherein $X_2$ is sulphur. Substitution in the rings A and B in general reduces activity. A preferred group of compounds of General Formula I are those of General Formula II

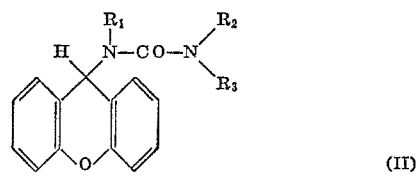

(II)

wherein $R_1$, $R_2$ and $R_3$ are as hereinbefore defined. Especially preferred groups are the compounds of General Formula II in which (a) $R_1$ is methyl, $R_2$ is alkyl and $R_3$ is hydrogen, and (b) $R_1$ is hydroxy or acyloxy, $R_2$ is alkyl or hydrogen, and $R_3$ is hydrogen. Particularly preferred compounds include the following:

N,N'-dimethyl-N-9-xanthenylurea
N-hydroxy-N-9-xanthenylurea
N-hydroxy-N'-methyl-N-9-xanthenylurea
N-acetoxy-N-9-xanthenylurea
N-isobutyryloxy-N-9-xanthenylurea
N-pivaloyloxy-N-9-xanthenylurea
N-acetoxy-N'-methyl-N-9-xanthenylurea
N-methoxyacetoxy-N'-methyl-N-9-xanthenylurea
N-methoxycarbonyloxy-N-9-xanthenylurea The compounds of the invention may be administered orally, rectally or parenterally, preferably orally, the optimum dosage rate varying with the activity of the compounds. A preferred dosage rate for oral administration is of the order of 0.025–4 g. daily, optionally in divided doses.

In use, the compounds of the invention are administered in conventional formulations, and therefore, according to a further aspect of the invention there are provided therapeutic compositions which comprise a compound of the hereinbefore described General Formula I in association with pharmaceutical excipients known for the production of compositions suitable for oral, rectal or parenteral administration.

The compositions of the invention preferably contain 0.1–90% by weight of a compound of General Formula I.

Compositions for oral administration are the preferred compositions of the invention, and these are the known pharmaceutical forms for such administration, such as for example tablets, capsules, syrups and aqueous and oily suspensions. The excipients used in the preparation of these compositions are the excipients known in the pharmacist's art. Preferred compositions are tablets wherein a compound of General Formula I is mixed with an inert diluent such as calcium phosphate in the presence of disintegrating agents, e.g. maize starch and lubricating agents e.g. magnesium stearate. Such tablets may, if desired, be provided with enteric coatings by known methods, for example by the use of cellulose acetate phthalate. Similarly capsules, for example hard or soft gelatin capsules, containing a compound of General Formula I, with or without other excipients, may be prepared by conventional means and, if desired, provided with enteric coatings in known manner. The tablets and capsules may conveniently each contain 25–500 mg. of a compound of General Formula I. Other compositions for oral administration include for example aqueous suspensions containing a compound of General Formula I in aqueous media in the presence of a non-toxic suspending agent e.g. sodium carboxymethylcellulose and dispersing agents, and oily suspensions containing a compound of General Formula I in a vegetable oil for example arachis oil.

Compositions of the invention suitable for rectal administration are the known pharmaceutical forms for such administration, such as for example suppositories with cocoa butter or polyethylene glycol bases.

Compositions of the invention suitable for parenteral administration are the known pharmaceutical forms for such administration, for example sterile suspensions in aqueous and oily media or sterile solutions in propylene glycol.

In the compositions of the invention the compounds of General Formula I may if desired be associated with other compatible pharmacologically active ingredients. For example antacids and acid absorbents such as aluminium hydroxide and magnesium trisilicate may be included in compositions for oral administration to give an immediate antacid effect. Other pharmacologically active agents which may be associated with the compounds of General Formula I include compounds active on the central nervous system, including short and long acting sedatives such as the barbiturates and methaqualone, antihistaminic and/or antiemetic agents such as cyclizine and diphenhydramine, and anticholinergic agents such as atropine.

Milk and milk solids are valuable in the treatment of peptic ulcer, and the compositions of the invention include liquid and solid compositions based on milk and milk solids.

For maximum stability, the compositions of the invention should preferably have a pH greater than 7; accordingly acidic excipients are not desirable.

In some formulations it may be beneficial to use the compounds of General Formula I in the form of particles of very small size, such as for example, as obtained by fluid energy milling.

According to another aspect of the invention there is provided a method of treating peptic ulcer which comprises adminstering to patient 0.25–4 grams daily of a compound of General Formula I, preferably of General Formula II; in a preferred embodiment of this aspect of the invention, administration is by the oral route; especially preferred is oral administration using enteric coated tablets.

The starting materials employed in the preparation of compounds of General Formula I are in many cases known compounds; where they are new, they are prepared by methods analogous to those employed for known compounds, and as such will be apparent to those skilled in the art. By way of example the preparation of some new intermediates is given below.

PREPARATIONS 1

A solution of 9-formamidoxanthen (30.5 g.) in tetrahydrofuran (400 ml.) was added to a suspension of lithium aluminium hydride (5.2 g.) in tetrahydrofuran (100 ml.) at room temperature. The mixture was stirred and refluxed for 5 hours, left to stand at room temperature overnight and then decomposed by the addition of water (5.2 ml.), 5 N sodium hydroxide solution (4 ml.) and water (16.8 ml.). The suspension was filtered, the solid was washed with ether, and the combined filtrate and washings were evaporated. The residual syrup was dissolved in ether and extracted into 3 N acetic acid solution (500 ml.) at 5–10° C. The aqueous extract was basified, the oil which separated was collected in ether and the dried, ethereal extract was evaporated. The residue was distilled to give 9-methylaminoxanthen, B.P. (bath) 110° C./0.1 mm.

Similarly 9-acetamidoxanthen was reduced to give 9-ethylaminoxanthen, B.P. 137–140° C./0.9 mm.

PREPARATION 2

9-xanthenyl acetate (1 g.), benzylamine (0.6 ml.) and toluene (10 ml.) were refluxed for 2 hours. The cooled solution was washed with aqueous sodium bicarbonate and water, and evaporated to an oil. This was dissolved in benzene (10 ml.), an excess of dry hydrogen chloride passed in, and then light petroleum (B.P. 62–68° C.; 30 ml.) added to give 9-benzylaminoxanthen hydrochloride, M.P. 157–161° C.

Similarly there were prepared:

N-methoxy-9-xanthenylamine, M.P. 45–46° C.
N,N-diethyl-N' - 9 - xanthenylethylenediamine, B.P. 130–134° C./0.05 mm.

The following non-limitative examples illustrate the invention.

EXAMPLE 1

Ethyl isocyanate (1 ml.) was added to a solution of 9-methylaminoxanthen (2.02 g.) in methylene chloride (10 ml.). There was an exothermic reaction and after 20 minutes at room temperature the solvent was evaporated. The residue was recrystallised from benzene to give N'-ethyl-N-methyl-N-9-xanthenylurea, M.P. 139–141° C.

In a similar manner the following compounds were prepared by reaction of the appropriate amine with the appropriate isocyanate or isothiocyanate:

N-ethyl-N'-methyl-N-9-xanthenylurea, M.P. 118–120° C.
N-hydroxy-N'-methyl-N-9-xanthenylurea, M.P. 185° C.
N'-ethyl-N-hydroxy-N-9-xanthenylurea, M.P. 173.5° C.
N-hydroxy-N'-propyl-N-9-xanthenylurea, M.P. 124–126° C.
N'-butyl-N-hydroxy-N-9-xanthenylurea, M.P. 174° C.
N-hydroxy-N'-methyl-N-9-xanthenylthiourea, M.P. 145.5–146° C.
N-methoxy-N'-methyl-N-9-xanthenylurea, M.P. 149–150° C.
N,N'-dimethyl-N-9-xanthenylurea, M.P. 170–172° C.
N-methyl-N'-propyl-N-9-xanthenylurea, M.P. 124–126° C.
N'-t-butyl-N-methyl-N-9-xanthenylurea, M.P. 126–127° C.
N'-acetyl-N-methyl-N-9-xanthenylurea, M.P. 142–143° C.
N'-(2-acetoxyethyl)-N-methyl-N-9-xanthenylurea, M.P. 107–108° C.
N'-t-butyl-N-hydroxy-N-9-xanthenylurea, M.P. 169–170° C.
N'-acetyl-N-hydroxy-N-9-xanthenylurea, M.P. 153–154° C.
N'-(2-acetoxyethyl)-N-hydroxy-N-9-xanthenylurea, M.P. 168° C.
N'-(2-chloroethyl)-N-methyl-N-9-xanthenylurea, M.P. 110–111° C.
N'-ally-N-methyl-N-9-xanthenylthiourea, M.P. 112.5–114° C.
N-benzyl-N'-ethyl-N-9-xanthenylurea, an oil
N-(2-diethylaminoethyl)-N'-methyl-N-9-xanthenylurea, an oil
N-benzyl-N'-methyl-N-9-xanthenylurea, an oil
N-cyclohexyl-N'-methyl-N-9-xanthenylurea, M.P. 173–175° C.
N'-ethoxycarbonylmethyl-N-methyl-N-9-xanthenylurea, an oil
N'-ethoxycarbonylmethyl-N-hydroxy-N-9-xanthenylurea, M.P. 158–160° C.
1,6-di(N-hydroxy-N-9-xanthenylureido)hexane, M.P. 194–196° C.
1,6-di(N-methyl-N-9-xanthenylureido)hexane, M.P. 186–188° C.
N'-benzenesulphonyl-N-hydroxy-N-9-xanthenylurea, M.P. 162–163° C.

EXAMPLE 2

Methyl isocyanate (25 ml.) was slowly added to a solution of xanthydrol (30 g.) and triethylamine (1 ml.) in benzene (120 ml.) at 65° C. The solution was kept at 55° C. until evolution of carbon dioxide ceased, refluxed for 1½ hours, cooled and filtered. The solid was collected and recrystallised from benzene to give N,N'-dimethyl-N-9-xanthenylurea solvated with 2 molecules of benzene, M.P. 170–171° C.

The solvate was dried to constant weight at 95° C./2 mm. to give N,N'-dimethyl-N-9-xanthenylurea, M.P. 173–174.5° C.

In a similar manner there was prepared N,N'-dimethyl-N-(2-chloro-9-xanthenyl)urea, M.P. 156–159° C.

The following compounds were prepared similarly from the appropriate xanthydrol and isocyanate but using methylene chloride as the reaction solvent at room temperature:

N,N'-diethyl-N-9-xanthenylurea, M.P. 125–127° C.
N,N'-dimethyl-N-9-thiaxanthenylurea, M.P. 162–163° C.
N,N'-dimethyl-N-(1-methyl-9-xanthenyl)urea, M.P. 171–172° C.
N-(2-fluoro-9-xanthenyl)-N,N'-dimethylurea, M.P. 172–174° C.
N-(1-chloro-9-xanthenyl)-N,N'-dimethylurea, M.P. 202–206° C.
N,N'-dimethyl-N-(4-methyl-9-xanthenyl)urea, M.P. 161–163° C.
N,N'-dimethyl-N-(1-fluoro-9-xanthenyl)urea, M.P. 211–212° C.
N,N'-dimethyl-N-(2-methoxy-9-xanthenyl)urea, M.P. 128–129.5° C.
N,N'-dibenzenesulphonyl-N-9-xanthenylurea, M.P. 205° C.

EXAMPLE 3

A solution of xanthydrol (20 g.) and hydroxyurea (7.6 g.) in ethanolic acetic acid (1:1, 200 ml.) was left overnight at room temperature. The solid which separated was washed with alcohol and dried to give N-hydroxy-N-9-xanthenylurea, M.P. 185° C.

In a similar manner the following compounds were prepared from the appropriate xanthydrol and the appropriate urea:

N-hydroxy-N-(1-methyl-9-xanthenyl)urea, M.P. 186.5–187° C.
N-hydroxy-N-(1-methoxy-9-xanthenyl)urea, M.P. 177–178° C.
N-hydroxy-N-(1-fluoro-9-xanthenyl)urea, M.P. 195–200° C.
N-hydroxy-N-(2-fluoro-9-xanthenyl)urea, M.P. 172–173° C.
N-hydroxy-N-(2-methoxy-9-xanthenyl)urea, M.P. 180–181° C.
N-hydroxy-N-(2-hydroxy-9-xanthenyl)urea, M.P. 167–169° C.
N,N'-dimethoxy-N-9-xanthenylurea, M.P. 143–144° C.
N-hydroxy-N-methyl-N'-9-xanthenylurea, M.P. 155–156° C.
N,N'-dimethyl-N-9-xanthenylurea, M.P. 170–172° C.
N',N'-diethyl-N-hydroxy-N-9-xanthenylurea, M.P. 130–132° C.
N-hydroxy-N',N'-3-oxapentamethylene-N-9-xanthenylurea, M.P. 164–167° C.
2-(9-xanthenyl)semicarbazide, M.P. 164–167° C.

EXAMPLE 4

(a) Potassium cyanate (0.5 g.) in water (5 ml.) was added to a stirred suspension of 9-xanthenylhydroxylamine (1 g.) in 5 N acetic acid (15 ml.). After stirring for ½ hour, the precipitated solid was collected and recrystallised from methanol to give N-hydroxy-N-9-xanthenylurea, M.P. 185° C.

(b) A solution of 9-methylaminoxanthen (5 g.) in dry benzene (10 ml.), was added slowly to a stirred solution of silicon tetraisocyanate (1.16 g.) in benzene (10 ml.). The resulting solution was refluxed for 45 minutes and then evaporated to dryness in vacuo. The residue was refluxed for 30 minutes with 90% isopropanol (20 ml.), filtered and the filtrate evaporated to dryness. The residue was washed with cold acetone and recrystallised from ethanol to give N-methyl-N-9-xanthenylurea, M.P. 199–202° C.

EXAMPLE 5

A mixture of xanthydrol (2 g.), N,N'-dimethylurea (1 g.), toluene (15 ml.) and acetic acid (0.6 ml.) was refluxed for 20 minutes, evaporated to dryness, the residue was washed with water and dried. It was recrystallised from benzene and the crystals dried at 90° C./2 mm. to give N,N'-dimethyl-N-9-xanthenylurea, M.P. 169–170° C.

EXAMPLE 6

A solution of N,N'-dimethyl - N - 9 - xanthenylurea benzene solvate (9.5 g.), prepared as described in Example 2, in tetrahydrofuran (50 ml.) was added to a stirred suspension of sodium hydride (1.3 g., 50% w./w. in oil) in tetrahydrofuran (5 ml.). The mixture was refluxed for 1 hour until hydrogen evolution ceased, cooled and ethyl chloroformate (3.63 g.) was added. The mixture was refluxed for 1½ hours, cooled, filtered and the filtrate was evaporated. The oily residue was dissolved in benzene, and unchanged urea starting material crystallised. The mother liquor was concentrated to dryness and the residue crystallised from light petroleum (B.P. 62–68° C.) to give N-ethoxycarbonyl - N,N' - dimethyl-N'-9-xanthenylurea, M.P. 76–78° C.

In a similar manner using benzoyl chloride in place of ethyl chloroformate, there was prepared N-benzoyl-N,N'-dimethyl-N'-9-xanthenylurea, M.P. 178–179° C.

EXAMPLE 7

Methylisothiocyanate (2.7 g.) was added to a solution of 9-methylaminoxanthen (7.8 g.) in methylene chloride (20 ml.). The solution was left to stand at room temperature for 3 days and then evaporated to dryness. The residue was crystallised from isopropanol to give N,N'-dimethyl-N-9-xanthenylthiourea, M.P. 152–153° C.

EXAMPLE 8

Acetic anhydride (0.015 mole) was added to a solution of N-hydroxy - N - 9 - xanthenylurea (0.01 mole) in dry pyridine (25 ml.). The mixture was shaken and left at room temperature overnight. After dilution with ice-water (250 ml.), the solid was collected and dried at room temperature. It was dissolved in the minimum amount of acetone, filtered, diluted with light petroleum (250 ml., B.P. 40–60° C.) and cooled to 0° C. The solid obtained was dried at room temperature to give N-acetoxy-N-9-xanthenylurea, M.P. 172–173° C.

In a similar manner the following compounds were prepared:

N-hydroxy-N-9-xanthenylurea:
 propionyl, M.P. 172–174° C.
 butyryl, M.P. 176–177° C.
 methoxyacetyl, M.P. 150–151° C.
 crotonyl, M.P. 164–167° C.
 (using phenyl isocyanate) N-phenylcarbamoyl, M.P. 170–172° C.
N-hydroxy-N'-methyl-N-9-xanthenylurea:
 acetyl, M.P. 157–159° C.
 propionyl, M.P. 136–138° C.
 butyryl, M.P. 158–161° C.
 methoxyacetyl, M.P. 161–164° C.
N'-ethyl-N-hydroxy-N-9-xanthenylurea:
 acetyl M.P. 162–164°C.
 methoxyacetyl, M.P. 127–128° C.

N-hydroxy-N'-propyl-N-9-xanthenylurea:
  acetyl, M.P. 134° C.
  methoxyacetyl, M.P. 116–117° C.
N' - butyl - N-hydroxy-N-9-xanthenylurea: acetyl, M.P. 121–122° C.
N' - t - butyl - N - hydroxy-N-9-xanthenylurea: acetyl, M.P. 151–152° C.
N' - acetyl - N - hydroxy-N-9-xanthenylurea: acetyl, M.P. 145–149° C.
N - hydroxy-N-methyl-N'-9-xanthenylurea: acetyl, M.P. 185–187° C.
N' - (2 - acetoxyethyl) - N - hydroxy-N-9-xanthenylurea: acetyl, M.P. 132–134° C.
2-(9-xanthenyl)semicarbazide:
  1-acetyl, M.P. 211–213° C.
  using methyl isocyanate 1-N-methylcarbamoyl, M.P. 229–231° C.
N - hydroxy - N' - ethoxycarbonylmethyl-N-9-xanthenylurea: acetyl, M.P. 149–150° C.
N - hydroxy - N',N'-3-oxapentamethylene-N-9-xanthenylurea; acetyl
N',N' - diethyl - N - hydroxy-N-9-xanthenylurea: acetyl, M.P. 93–95° C.
1,6 - di(N - hydroxy - N-9-xanthenylureido)hexane: diacetyl, M.P. 177–178° C.

EXAMPLE 9

A solution of cyclohexanoyl chloride (0.012 mole) in dry pyridine (25 ml.) at 0° C. was mixed with a solution of N-hydroxy-N-9-xanthenylurea (0.01 mole) in dry pyridine (25 ml.) at 0° C., and then the procedure of Example 8 was followed to give N-cyclohexanoyloxy-N-9-xanthenylurea, M.P. 155–158° C.

In a similar manner the following esters were prepared:
N-hydroxy-N-9-xanthenylurea:
  benzoyl, M.P. 165–166° C.
  2-furoyl, M.P. 164–165° C.
  2-thenoyl, M.P. 151–153° C.
  nicotinoyl, M.P. 164–166° C.
  octanoyl, M.P. 121–122° C.
  stearyl, M.P. 90–93° C.
N-hydroxy-N'-methyl-N-9-xanthenylurea: benzoyl, M.P. 179–180° C.

Using the above method, but keeping the reaction mixture overnight at 0° C. instead of room temperature, the following esters were prepared:
N-hydroxy-N-9-xanthenylurea:
  isobutyryl, M.P. 156.5–159.5° C.
  pivaloyl, M.P. 155–158° C.
N - hydroxy - N'-methyl-N-9-xanthenylurea: isobutyryl, M.P. 168–170° C.

EXAMPLE 10

Ethyl chloroformate (2 ml.) was added dropwise to dry pyridine cooled to −20° C. To this solution was added N-hydroxy-N-9-xanthenylurea (1.3 g.) in dry pyridine (15 ml.) and the resulting mixture was stirred and allowed to come to room temperature over 45 minutes. On dilution with ice-water, a solid was obtained which was recrystallised from acetone/light petroleum to give N - ethoxycarbonyloxy - N - 9-xanthenylurea, M.P. 164–168° C.

In a similar manner there were prepared:
N - ethoxycarbonyloxy-N' - methyl-N-9-xanthenylurea, M.P.171–175° C.
N - methoxycarbonyloxy-N-9-xanthenylurea, M.P. 160–161.5° C.
N - phenoxycarbonyloxy-N-9-xanthenylurea, M.P. 150–151° C.

EXAMPLE 11

A mixture of N,N-dimethyl-N'-9-xanthenylurea (7 g.), 50% sodium hydride (2.52 g.) and tetrahydrofuran (110 ml.) was stirred and refluxed for 2 hours. After cooling methyl iodide (7:4 ml.) was added and the mixture stirred at room temperature overnight and then refluxed for 1 hour. After cooling, methyl iodide (2 ml.) was added, and after further stirring at room temperature for 3 hours, the mixture was filtered and the filtrate evaporated. The residue was dissolved in benzene, filtered, the filtrate concentrated to 25 ml., diluted with light petroleum (B.P. 40–60° C.; 125 ml.), filtered and the filtrate evaporated to an oil. This was dissolved in light petroleum (B.P. 40–60° C.; 35 ml.), cooled to −80° C., and the supernatant left to stand at room temperature. The resulting precipitate was then recrystallised from light petroleum (62–68° C.) to give N,N',N'-trimethyl-N-9-xanthenylurea, M.P. 85.5–87° C.

EXAMPLE 12

(a) A solution of N' - (2 - acetoxyethyl)-N-hydroxy-N-9-xanthenylurea (2 g.) in methanol (20 ml.) and potassium cyanide (about 50 mg.) was refluxed for 1 hour. Cooling to 0°C. and filtration, and recrystallisation of the solid gave N-hydroxy-N'-(2-hydroxyethyl)-N-9-xanthenylurea, M.P. 179° C.

In a similar manner there was prepared N'-(2-hydroxyethyl) - N - methyl - N - 9 - xanthenylurea, M.P. 130–132° C.

(b) A solution of N'-ethoxycarbonylmethyl-N-hydroxy-N-9-xanthenylurea (3 gm.) in absolute alcohol (100 ml.) and N-sodium hydroxide (10 ml.) was stirred at room temperature for 2 hours. The precipitated sodium salt was collected, dried, and dissolved in water (25 ml.). Acidification with a few drops of acetic acid precipitated the product which was recrystallised from acetone/light petroleum (40–60° C.) to give N'-carboxymethyl-N-hydroxy-N-9-xanthenylurea, M.P. 171–173° C.

In a similar manner there was prepared N'-carboxymethyl-N-methyl-N-9-xanthenylurea, M.P. 145.5–146° C.

EXAMPLE 13

A solution of N - hydroxy - N - 9-xanthenylurea (2.6 g.), hexamethyldisilazine (1.8 g.) and chlorotrimethylsilane (0.9 g.) in pyridine (25 ml.) was left overnight at room temperature. Dilution with water precipitated N - trimethylsiloxy - N' - trimethylsilyl-N-9-xanthenylurea which crystallised from light petroleum (40–60° C.), and had an M.P. 118–119° C.

In a similar manner there was prepared N'-methyl-N-trimethylsiloxy - N - 9 - xanthenylurea, M.P. 142–143° C.

EXAMPLE 14

A mixture of N-hydroxy-N'-methyl-N-9-xanthenylurea (2.7 g.), potassium carbamate (5 g.) and methyl iodide (2 g.) in acetone (50 ml.) was stirred and refluxed for 5 hours. Filtration and evaporation of the solvent gave N-methoxy-N'-methyl-N-9-xanthenylurea, M.P. 149–150° C.

(Satisfactory elemental analyses were obtained for all the compounds described in Examples 1–14. In many cases, the compounds melted at the temperatures described with decomposition.)

EXAMPLE 15

In the preparation of tablets mixtures of the following type may be tabletted in conventional manner.

|  | Percent by wt. |
|---|---|
| Compound of General Formula I | 10–90 |
| Calcium phosphate | 0–80 |
| Maize starch | 5–10 |
| Magnesium stearate | ca. 1 |
| Microcrystalline cellulose | 0–90 |

EXAMPLE 16

In the preparation of tablets the following mixture was dry granulated and compressed in a tabletting machine to give tablets containing 50 mg. of active ingredients:

| | Percent |
|---|---|
| N,N'-dimethyl-N-9-xanthenylurea | 25 |
| Maize starch | 10 |
| Calcium phosphate | 20 |
| Magnesium stearate | 1 |
| Microcrystalline cellulose, to 100% by weight. | |

EXAMPLE 17

In the preparation of enteric coated tablets, tablets prepared as described in Example 16 were coated with sanderac varnish and then coated with cellulose acetate phthalate using a solution of 20% cellulose acetate phthalate and 3% diethyl phthalate in a mixture of equal parts of industrial alcohol and acetone.

EXAMPLE 18

In the preparation of tablets the following mixture was dry granulated and compressed in a tabletting machine to give tablets containing 5 mg. of active ingredient. N,N'-dimethyl-N-9-xanthenylurea (10 g.), lactose (5 g.), calcium phosphate (5 g.) and maize starch (5 g.).

EXAMPLE 19

In the preparation of enteric coated tablets, the tablets described in Example 18 were given a thin coat of shellac followed by 20 coats of cellulose acetate phthalate.

EXAMPLE 20

In the preparation of capsules, a mixture of the ingredients described in Example 18 was encapsulated in hard gelatin capsules. Enteric coating was applied by conventional dipping in cellulose acetate phthalate.

EXAMPLE 21

The following mixture was compressed into tablets in a conventional manner:

| | Percent |
|---|---|
| N,N'-dimethyl-N-9-xanthenylurea | 25 |
| Sodium bicarbonate | 75 |
| Peppermint oil, q.s. | |

EXAMPLE 22

In the preparation of capsules a mixture of equal parts by weight of N,N'-dimethyl-N-9-xanthenylurea and calcium phosphate was encapsulated in hard gelatin capsules, each capsule containing 50 mg. of the urea.

EXAMPLE 23

In the preparation of enteric coated capsules, the capsules of Example 22 were coated with cellulose acetate phthalate in the conventional manner.

EXAMPLE 24

Suppositories weighing 1 g. and containing 50 mg. N,N'-dimethyl-N-9-xanthenylurea were prepared in conventional manner using a base consisting of

| | Percent |
|---|---|
| Polyethylene glycol 4000 | 33 |
| Polyethylene glycol 6000 | 47 |
| Water | 20 |

EXAMPLE 25

A solution for parenteral administration was prepared comprising N,N'-dimethyl-N-9-xanthenylurea in propylene glycol, 100 mg./2 ml. sterilized by filtration.

Compositions similar to those described in Examples 15–25 were also prepared, containing the other preferred compounds described previously in place of N,N'-dimethyl-N-9-xanthenylurea.

We claim:

1. A therapeutic composition useful for treating peptic ulcers which comprises an effective antisecretory amount of a xanthene compound of the formula

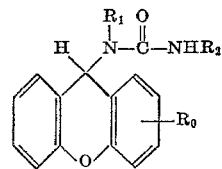

in which $R_0$ is selected from the group consisting of hydrogen, halogen, alkyl, lower alkoxy and hydroxy;
$R_1$ is hydroxy;
$R_2$ is selected from the group consisting of hydrogen, alkyl, hydroxyalkyl, alkanoyloxyalkyl, loweralkoxyalkyl and alkanoyl; and
wherein the term "alkyl" indicates such groups containing up to 7 carbon atoms; the term "alkoxy" indicates such groups containing up to 6 carbon atoms; and the term "alkanoyl" indicates such groups containing up to 18 carbon atoms; in association with a pharmaceutically acceptable excipient.

2. The composition of claim 1 which comprises 0.1–90% by weight of the xanthene compound.

3. The composition of claim 1 in the form of a tablet or a capsule.

4. The composition of claim 3 wherein said composition is enteric coated.

5. The composition of claim 3 wherein said composition contains 25–500 mg. of the xanthene compound.

6. The composition of claim 1 in the form of a rectal suppository.

7. The composition of claim 1 wherein the xanthene compound is N-hydroxy-N-9-xanthenylurea.

8. A method of treating peptic ulcer which comprises administering to a patient a therapeutically effective antisecretory amount of a xanthene compound of the formula

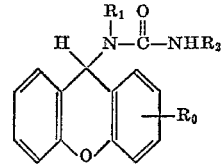

in which $R_0$ is selected from the group consisting of hydrogen, halogen, alkyl, lower alkoxy and hydroxy;
$R_1$ is hydroxy;
$R_2$ is selected from the group consisting of hydrogen, alkyl, hydroxyalkyl, alkanoyloxyalkyl, loweralkoxyalkyl and alkanoyl; and
wherein the term "alkyl" indiactes such groups containing up to 7 carbon atoms; the term "alkoxy" indicates such groups containing up to 6 carbon atoms; and the term "alkanoyl" indicates such groups containing up to 18 carbon atoms.

9. The method of claim 8 wherein said xanthene compound is administered orally.

10. The method of claim 9 wherein said xanthene compound is administered at a therapeutically effective dosage rate of up to about 4 grams per day.

11. The method of claim 8 wherein said xanthene compound is N-hydroxy-N-9-xanthenylurea.

References Cited

Bond et al., J.A.P.H.A., vol. 43, No. 1, pp. 32–35 (1954).

ALBERT T. MEYERS, Primary Examiner

F. E. WADDELL, Assistant Examiner